UNITED STATES PATENT OFFICE 2,588,215

PENTACHLORODIMETHOXYMETHANO-TETRAHYDROINDENE

John W. Dawson, Huntsville, Ala., and Willard J. Croxall, Bryn Athyn, Pa., assignors to Rohm & Haas Company, Philadelphia, Pa., a corporation of Delaware No Drawing. Application December 9, 1950, Serial No. 200,089

1 Claim. (Cl. 260—611)

This invention concerns pentachlorodimethoxymethanotetrahydroindene having the probable structure

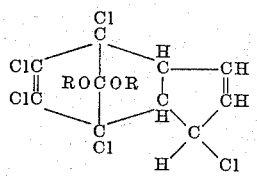

wherein R is a lower alkyl group, in particular the methyl group. This invention also deals with a method whereby this compound is prepared.

In our application Serial No. 100,766, filed June 22, 1949, now U. S. Patent No. 2,562,893, issued August 7, 1951, of which the present application is a continuation-in-part, it is shown that hexachlorocyclopentadiene reacts with an alcohol such as methanol in the presence of a strong alkali to form 1,1-dimethoxy-2,3,4,5-tetrachlorocyclopentadiene and that this compound reacts by addition with cyclopentadiene to form 4,5,6,7-tetrachloro-8,8-dimethoxy - 4,7-methano-3a,4,7,7a-tetrahydroindene. In our above-identified application the last-named compound is chlorinated to yield hexachlorodimethoxymethanotetrahydroindane.

In the instant case 4,5,6,7-tetrachloro-8,8-dimethoxy-4,7-methano - 3a,4,7,7a - tetrahydroindene is reacted with an alkyl hypochlorite between 30° and 70° C. in the presence of a boron trifluoride catalyst to yield pentachlorodimethoxymethanotetrahydroindene. This compound has a number of distinctive properties. It is an insecticide which possesses marked effectiveness as a stomach poison against a variety of insects. At the same time it has a capacity for causing rapid paralytic action as is demonstrated by knockdown action. Furthermore, it can add reactive atoms and groups at its active unsaturated linkage.

In the preparation of this compound there may be used as a starting material hexachlorocyclopentadiene, which is reacted between 0° and 60° C. with methyl alcohol, usually in excess, in the presence of about two moles of an alkali hydroxide per mole of hexachlorocyclopentadiene. Any excess alkali is neutralized and the dimethoxytetrachlorocyclopentadiene formed is separated by distillation at low pressure. A similar reaction can be effected with ethyl alcohol or other alcohols.

This dimethoxy compound is reacted with cyclopentadiene, conveniently in an inert organic solvent such as benzene, toluene, xylene, or naphtha. There is desirably used in this reaction mixture a polymerization inhibitor, such as hydroquinone or naphthol in an amount between 0.01% and 5% of the weight of reactants. The reaction mixture is stirred and heated at 50° C. to 100° C. The product, tetrachlorodimethoxymethanotetrahydroindene, is conveniently isolated by distillation.

This compound is reacted with an alkyl hypochlorite. The reaction is desirably effected in the presence of an inert organic solvent such as benzene, toluene, ethylene dichloride, or the like. The reaction is promoted upon the addition of a boron-trifluoride catalyst. When reaction appears complete, the reaction mixture is washed with water and/or an alkaline solution, the organic layer is collected, and this layer is concentrated and distilled.

As catalyst, there may be added boron trifluoride itself or a coordination complex of boron trifluoride and an oxygenated compound such as an alcohol, ether, ketone, aldehyde, carboxylic acid, or the like. The complex of butyl ether or ethyl ether is a convenient one to use. Similarly, the methanol complex is suitable and convenient for use.

The alkyl hypochlorite is usually prepared by treating an alcohol with an alkali and chlorine or with a hypochlorite. Particularly useful are the tert.-alkyl hypochlorites, such as tert.-butyl or tert.-amyl hypochlorite, which have desired stability. The hypochlorite is ordinarily used in slight excess on the basis of the tetrachlorodimethoxymethanotetrahydroindene.

A typical preparation of the dimethoxy compound of this invention follows. Parts are by weight.

*Example*

(a) Potassium hydroxide in an amount of 123.5 parts (2.2 moles) is dissolved in 256 parts (8 moles) of methanol and the solution added slowly over three hours to a well-stirred suspension of 272.5 parts (1.0 mole) of hexachlorocyclopentadiene in 126 parts (4.0 moles) of methanol at 5°–10° C. After addition is complete, the reaction mixture is allowed to come to room temperature while being stirred over four hours. Stirring is continued overnight. The reaction mixture is brought to neutrality by the addition of 12 N hydrochloric acid and filtered. The potassium chloride separated is washed with acetone and the washings added to the filtrate. The liquors are stripped of solvent and distilled in vacuo to give a 90% yield of 1,1-dimethoxy-2,3,4,5-tetrachlorocyclopentadiene, distilling at 79°–82° C./0.5 mm. This product has a refractive index, $n_D^{30}$, of 1.5282, and contains 53.88% of chlorine (theory 53.80%).

(b) There are dissolved 264 parts (1 mole) of this compound and 2 parts of di-beta-naphthol in 200 parts of toluene and the mixture is heated to reflux temperature. Sixty-six parts (1.0 mole) of cyclopentadiene are introduced below the surface over four hours to the well-stirred, refluxing toluene solution. Stirring and heating are continued for 30 minutes. The reaction mixture is stripped of solvent and distilled in vacuo giving a 75% yield of 4,5,6,7-tetrachloro-4,7-endomethylene-8,8-dialkoxy - $3a,4,7,7a$ - tetrahydroindene distilling at 114° C./0.5 mm.

(c) A solution was prepared from 330 parts of tetrachlorodimethoxymethanotetrahydroindene and 600 parts of ethylene dichloride. Thereto over the course of two hours there were added with stirring 108.5 parts of tert.-butyl hypochlorite while the reaction mixture was maintained at about 50° C. During the addition of the butyl hypochlorite there were added three portions of the boron trifluoride-methanol complex in a total amount of six parts. The temperature of the reaction mixture rose as much as twenty centigrade degrees when catalyst was added. Finally the reaction was cooled and washed with water, the organic layer was taken off, and it was distilled. After the solvent had been stripped off, a fraction of 108 parts was taken at 126°–151° C./0.2–0.3 mm. and then a fraction of 245 parts at 153°–194° C./0.3–1.3 mm. This was redistilled. The main fraction taken at 146.5°–161° C./0.2–1.16 mm. was practically pure 3,4,5,6,7-pentachloro-8,8-dimethoxy-4,7-methano - $3a,4,7,7a$ - tetrahydroindene, having a refractive index, $n_D^{20}$, of 1.5470 and giving molecular weight determinations of 361–366 (theory 364.5).

A two per cent solution in kerosene gave a knockdown of 47% in the Peet-Grady test. All of the flies knocked down were dead in a short time. The fly spray had a vary mild odor and was judged by those working with it as free of irritation. When the kerosene solution was tested against roaches, a kill of 100% was obtained with a one cc. dose in a standard test and a kill of 95% with a 0.6 cc. dose.

A self-emulsifying concentrate was prepared from one part of the compound, two parts of solvent, and one part of an oil-soluble non-ionic emulsifier. This preparation was used in an aqueous spray at a dilution of compound of about 1:100. The kill of bean beetle larvae was 77%. The kill of armyworm was 100%. At 0.5% and 0.25% dilutions this compound still gave controls of 97% against armyworm and at 0.1% an 80% control.

The compound is reactive toward halogens, adding them apparently to the double bond of the five-membered cycle. It can also add hydrogen halides and thiocyanic acid.

We claim:

As a new chemical compound, a substance of the formula

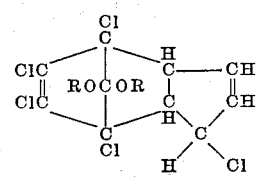

wherein R is the methyl group.

JOHN W. DAWSON.
WILLARD J. CROXALL.

No references cited.